United States Patent

Victory et al.

[11] Patent Number: 6,053,007
[45] Date of Patent: Apr. 25, 2000

[54] PROCESS FOR SEPARATING A MULTI-COMPONENT GAS STREAM CONTAINING AT LEAST ONE FREEZABLE COMPONENT

[75] Inventors: Donald J. Victory, Sugar Land; Eugene R. Thomas, Houston, both of Tex.

[73] Assignee: ExxonMobil Upstream Research Company, Houston, Tex.

[21] Appl. No.: 09/106,152

[22] Filed: Jun. 29, 1998

Related U.S. Application Data

[60] Provisional application No. 60/051,460, Jul. 1, 1997.

[51] Int. Cl.[7] .................................................... F25J 3/00
[52] U.S. Cl. ................................................ 62/619; 62/620
[58] Field of Search ............................ 62/611, 613, 614, 62/618, 619, 620, 621, 929, 622, 928

[56] References Cited

U.S. PATENT DOCUMENTS

| | | | |
|---|---|---|---|
| 4,889,545 | 12/1989 | Campbell et al. | 62/621 |
| 5,062,270 | 11/1991 | Haut et al. | 62/620 |
| 5,335,504 | 8/1994 | Durr et al. | 62/620 |

*Primary Examiner*—William Doerrler
*Attorney, Agent, or Firm*—Gary D. Lawson

[57] ABSTRACT

This invention relates generally to a separation process in which a multi-component feed stream is introduced into a separation system that operates under solids forming conditions for at least one of the feed stream components. The freezable component, although typically $CO_2$, $H_2S$ or another acid gas, can be any component that has the potential for forming solids in the separation system. The multi-component feed stream is introduced into a separation system, at least a portion of which operates under solids forming conditions for at least one component of the feed stream. A vapor stream is withdrawn from an upper region of the separation system and compressed to a higher pressure stream. At least a portion of the compressed stream is cooled and then expanded to a lower pressure to further cool the compressed stream. At least a portion of the expanded stream is returned to the separation system, thereby providing refrigeration to the separation system.

26 Claims, 6 Drawing Sheets

PROCESS FOR SEPARATING A MULTI-COMPONENT GAS STREAM CONTAINING AT LEAST ONE FREEZABLE COMPONENT

REFERENCE TO RELATED APPLICATION

This application claims the benefit of U.S. Provisional patent application Ser. No. 60/051,460 filed Jul. 1, 1997.

FIELD OF THE INVENTION

The invention is a distillative process for separating a multi-component gas stream in which at least one component has the potential to freeze during the separation process. More specifically, the invention relates to a process for using open-loop refrigeration to provide cooling to a distillation system operating under solids forming conditions for at least one of the components in a feed stream to the distillation system.

BACKGROUND OF THE INVENTION

Many natural gas reservoirs contain relatively low percentages of hydrocarbons (less than 40%, for example) and high percentages of acid gases, principally carbon dioxide, but also hydrogen sulfide, carbonyl sulfide, carbon disulfide and various mercaptans. Removal of acid gases from well production in remote locations is desirable to provide conditioned or sweet, dry natural gas either for delivery to a pipeline, natural gas liquids recovery, helium recovery, conversion to liquid natural gas or nitrogen rejection.

Cryogenic distillation has been used to separate carbon dioxide from methane since the relative volatility between methane and carbon dioxide is reasonably high. The overhead vapor is enriched with methane and the bottoms product is enriched with carbon dioxide and other heavier hydrocarbons. Cryogenic distillation processing requires the proper combination of pressure and temperature to achieve the desired product recovery.

The distillation functions by countercurrent vapor-liquid contacting, with vapors rising to the top and liquids passing downward in a vertical column. Trays, plates, or packing are typically used to bring the two phases into equilibrium. The differences in the volatility of the constituents cause vapor-liquid exchange of constituents at the contacting surfaces. Heat is generally applied at the bottom of the column to generate the rising vapor. Some of the top vapor is typically condensed to provide reflux liquid which carries constituents of lower volatility downward.

Cryogenic distillation can encounter potential difficulties when the feed stream to the tower contains significant quantities of one or more constituents that can freeze (for example, more than about 2% carbon dioxide) at normal column operating conditions. When a gas containing large quantities of carbon dioxide encounters the process conditions of a cryogenic demethanizer, the carbon dioxide can potentially freeze, thereby plugging the trays or packing and preventing tower operation. A successful distillative process to separate methane from carbon dioxide and other hydrocarbons must deal with the potential formation of carbon dioxide solids.

In what has become known as the "Ryan/Holmes process", methane and carbon dioxide are separated in a distillation column. The Ryan/Holmes process involves operation of the distillation column at temperatures, compositions and pressures which produce a solids potential zone for carbon dioxide within the column. The term "solids potential zone" is used with the Ryan/Holmes process because, although conditions in the tower are such that carbon dioxide solids would normally occur, the Ryan/Holmes process prevents actual solids formation from occurring. This is achieved by introducing into the upper portion of the distillation column an additive to suppress formation of acid gas solids. The Ryan/Holmes additive, which is a non-polar material that is miscible with methane, may comprise ethane, propane, butane, pentane, and mixtures thereof. After the methane/carbon dioxide separation, the additive is recovered in another distillation column. A more detailed description of the Ryan/Holmes process is disclosed in U.S. Pat. Nos. 4,318,723; 4,383,842; 4,451,274; and 4,462,814.

In what has become known as the "CFZ process" (an acronym for "Controlled-Freeze-Zone" process), a process has been proposed to take advantage of the freezing potential of carbon dioxide in cryogenic distillation, rather than avoiding solid carbon dioxide. In the CFZ process, acid gas components are separated by cryogenic distillation through the controlled freezing and melting of carbon dioxide in a single column, without use of freeze-suppression additives. The CFZ process uses a cryogenic distillation column with a special internal section (CFZ section) to handle the solidification and melting of $CO_2$. This CFZ section does not contain packing or trays like conventional distillation columns, instead it contains one or more spray nozzles and a melting tray. Solid carbon dioxide forms in the vapor space in the distillation column and falls into the liquid on the melting tray. Substantially all of the solids that form are confined to the CFZ section. The portions of the distillation column above and below the CFZ section of the column are similar to conventional cryogenic demethanizer columns. A more detailed description of the CFZ process is disclosed in U.S. Pat. Nos. 4,533,372; 4,923,493; 5,120,338; and 5,265,428.

In both the Ryan/Holmes process and the CFZ process, the cryogenic distillation column used for separation of methane and carbon dioxide typically requires refrigeration to keep the upper portion of the distillation column below about $-56.7°$ C. ($-70°$ F.), and potentially below about $-95.6°$ C. ($-140°$ F.). If the gas stream contains $CO_2$ in concentrations such that the $CO_2$ may freeze out as solids during the distillation operation, the refrigeration system that cools the fractionation column must either prevent freezing of $CO_2$ solids or manage solids that are formed. The concentration of $CO_2$ in a gas stream at which freezing can occur depends primarily on the gas components, temperature and pressure. Gas streams containing as little as 50 ppm $CO_2$ under certain conditions can form $CO_2$ solids. The potential for solids formation increases with increasing concentrations of $CO_2$. For example, gas streams having more than about 6% $CO_2$ have a high potential for $CO_2$ freezing in cryogenic columns. In the past, because of this freezing potential, refrigeration for fractional distillation columns containing significant $CO_2$ content was provided by liquid refrigerant in a closed-loop system, such as a cascaded propane-ethylene system, sometimes referred to as "external refrigeration."

While external refrigeration systems have high thermodynamic efficiencies and they can provide the cooling needed to reflux the distillation column, they require extra rotating equipment and means to store and make up the refrigerant. On offshore oil and gas production platforms that support distillation systems, external refrigeration systems have the additional disadvantage of increasing the space and weight requirements of the platform, substantially adding to the cost of the platform. In remote locations, importing refrigerant make up can be costly, and in some applications is impractical.

In the art of distillative fractionation of streams that contain potential solid formers, there is a substantially unfilled need for an improved process that minimizes, and potentially avoids, the need for external refrigerants and associated systems.

SUMMARY OF THE INVENTION

This invention relates generally to a separation process in which a multi-component feed stream is introduced into a separation system that operates under solids forming conditions for at least one of the feed stream components. The freezable component, although typically $CO_2$, $H_2S$ or another acid gas, can be any component that has the potential for forming solids in the separation system.

Since the separation system operates under solids forming conditions, the separation system will comprise systems that manage solids formation or the separation system will introduce an additive to the system to suppress solids formation. In one embodiment, the separation system contains a controlled freeze zone ("CFZ") to manage solids formation. In another embodiment, a freeze suppression agent is added to the system. In still another embodiment, the separation system contains a CFZ to manage solids that may form and uses a freeze suppression agent to suppress solids formation.

In each embodiment of the separation system, a vapor stream is withdrawn from an upper region of the separation system and is compressed to a higher pressure and cooled. The cooled, compressed stream is then expanded by an expansion means to produce a predominantly liquid stream. At least a portion of the liquid stream is fed as a reflux stream to the separation system, thereby providing open-loop refrigeration to the separation system. A portion of the overhead liquid reflux stream may optionally be recovered as high pressure (above about 1,380 kPa) liquid natural gas (LNG).

An object of the present invention is to provide a new and effective system for separating multi-component feed streams in a separation system operating under solids forming conditions for at least one of the components.

Another object of the present invention, while achieving the before-stated object, is to provide an open-loop refrigeration system to the separation system.

Yet another object of the present invention, while achieving the before-stated objects, is to provide an improved means for producing liquid natural gas.

Other objects, advantages, and features of the present invention will become apparent to those skilled in the art from a reading of the following description when read in conjunction with the drawings.

DETAILED DESCRIPTION OF THE INVENTION

The process of this invention distillatively separates a multi-component gas stream in a separation system that operates under solids forming conditions for at least one of the feed stream components. The process is well-suited for gas streams that contain one or more acid gases (such as $CO_2$ and $H_2S$) which can potentially drop out as solids during cryogenic distillation operations. The process of this invention minimizes, and potentially avoids, the need for external refrigerants and associated systems.

In the process of this invention, a portion of the residue gas from the top of a distillation column is compressed, chilled, and expanded, producing a predominantly liquid stream. At least a portion of the expanded liquid stream is recycled to the top of the column to provide refrigeration to the column. It has been discovered that in the process of this invention open-loop refrigeration can provide cooling to the distillation column even when the feed gas stream contains a high percentage of an acid gas such as $CO_2$. Before this invention, open-loop refrigeration was avoided in cryogenic distillation processing of gases with components that could potentially freeze. Costly operational problems can occur if solids formation is not properly managed.

The invention will be described herein in connection with the separation of a natural gas stream containing $CO_2$, $H_2S$, $CH_4$, and heavier hydrocarbons. The invention may be used to accomplish the primary separation of any two components in a separation system that operates under solids forming conditions for at least one of the components. The freezable component is typically $CO_2$, $H_2S$ or another acid gas, although any component that undergoes at least partial freezing under the operating conditions of the separation system may be a freezable component. All such feed streams are within the scope of the present invention which is limited only by the appended claims.

The operating conditions under which a component of the feed stream will freeze is a function of the feed stream composition, the chemical character of the freezable component, product specifications, and the separation system's temperature and pressure. Typically, the solid forming conditions for any freezable component of the feed stream will be determined empirically through the use of commercially available process simulation software, as more fully described below.

Figure 1:
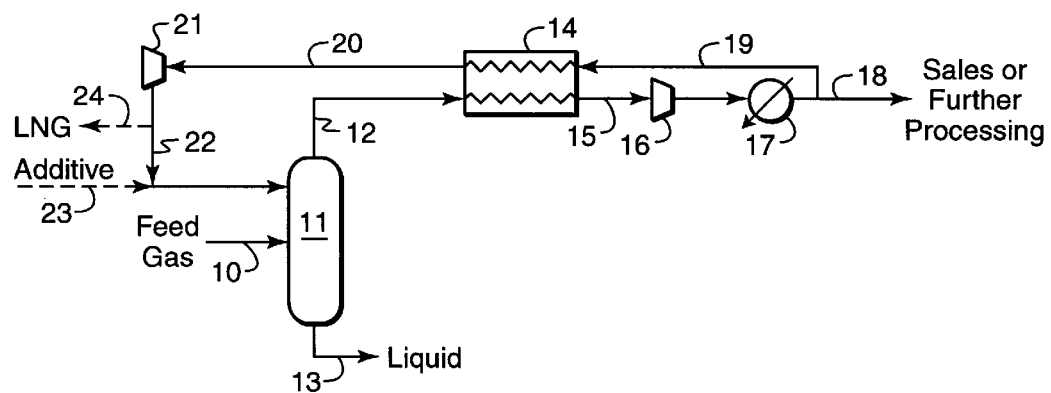
FIG. 1 is a schematic representation of a cryogenic, distillative process generally illustrating open-loop refrigeration in the practice of the present invention.

FIG. 1 illustrates a simplified schematic of open-loop refrigeration in the practice of this invention. Referring to FIG. 1, a multi-component gas stream 10 containing methane and carbon dioxide that has been dehydrated and cooled in heat exchangers (not shown) is fed into a fractionation column 11. The temperature of the gas fed into column 11 is preferably above the $CO_2$ solidification temperature. A methane-enriched vapor stream 12 exits the overhead of column 11 and a carbon dioxide-enriched stream 13 exits the bottom of column 11. A portion of the column's overhead is refluxed back to the column to provide open-loop refrigeration. The remaining portion of the overhead gas (stream 18) may be used as sales gas or further processed. The principal components of open-loop refrigeration comprise compressing by one or more compressors 16 the overhead gas exiting the top of the distillation column 11, cooling the compressed gas by one or more coolers 17, passing at least part of the cooled gas (stream 19) to one or more expansion means 21 to decrease the pressure of the gas stream and to cool it, and feeding at least a portion of the cooled, expanded stream 22 to the fractionation column 11. The recycling of at least part of the overhead vapor provides open-loop refrigeration to column 11. Stream 19 is preferably cooled by heat exchanger 14 which also warms the vapors in stream 12. The pressure of stream 22 is preferably controlled by regulating the amount of compression to ensure that the pressure in streams 19, 20, and 22 is high enough to prevent formation of solids. Returning at least part of the overhead vapor stream 12 to the upper portion of column 11 as liquid, condensed by open-loop refrigeration, provides reflux to column 11.

All of the embodiments of this invention use open-loop refrigeration and effectively manage the potential for the formation of solids. In one embodiment, stream 22 exiting the expansion means 21 may be mixed with a freeze suppression additive (stream 23) and then fed to a conventional fractionation column 11. If enough freeze suppressing additive is present, column 11 can be a conventional fractionation column containing multiple vapor-liquid contact devices, such as trays and packing. In this embodiment, the pressure of stream 22 is preferably controlled at a high enough pressure to prevent solids from forming in stream 22 before the additive is introduced.

In another embodiment, the solids are managed by feeding stream 22 directly into a fractionation column with a controlled freeze zone ("CFZ"), special section to handle solidification and melting of $CO_2$. (Although a CFZ is not illustrated in column 11 in FIG. 1, a CFZ is illustrated schematically in FIGS. 2, 4, and 5). A distillation column having a CFZ will have a conventional distillation section below the CFZ section and potentially another distillation section above the CFZ section. The CFZ section handles any formation and melting of the solids. During start-up, all of stream 22 may be diverted directly to the CFZ section. As stream 22 becomes leaner in the solids formers, more of stream 22 can be fed to the distillation section of the column above the CFZ section.

In another embodiment, a combination of the previous embodiments, the pressure and/or additive is used to control solids formation in the open-loop and a CFZ section is used to manage the solids in the column.

In still another embodiment, a portion of stream 22, which is high pressure liquid natural gas (LNG), may optionally be split off as stream 24. The high pressure LNG in stream 24 is at a pressure that is at or near the operating pressure of the distillation column. If desired, the high pressure LNG of stream 24 may be converted to low pressure LNG by additional cooling, compression and pressure expansion (not shown in the Figs.) to produce LNG that is at or near atmospheric pressure. Alternatively, other processes such as an external refrigeration process could be used to convert the high pressure LNG to low pressure LNG.

Figure 2A:
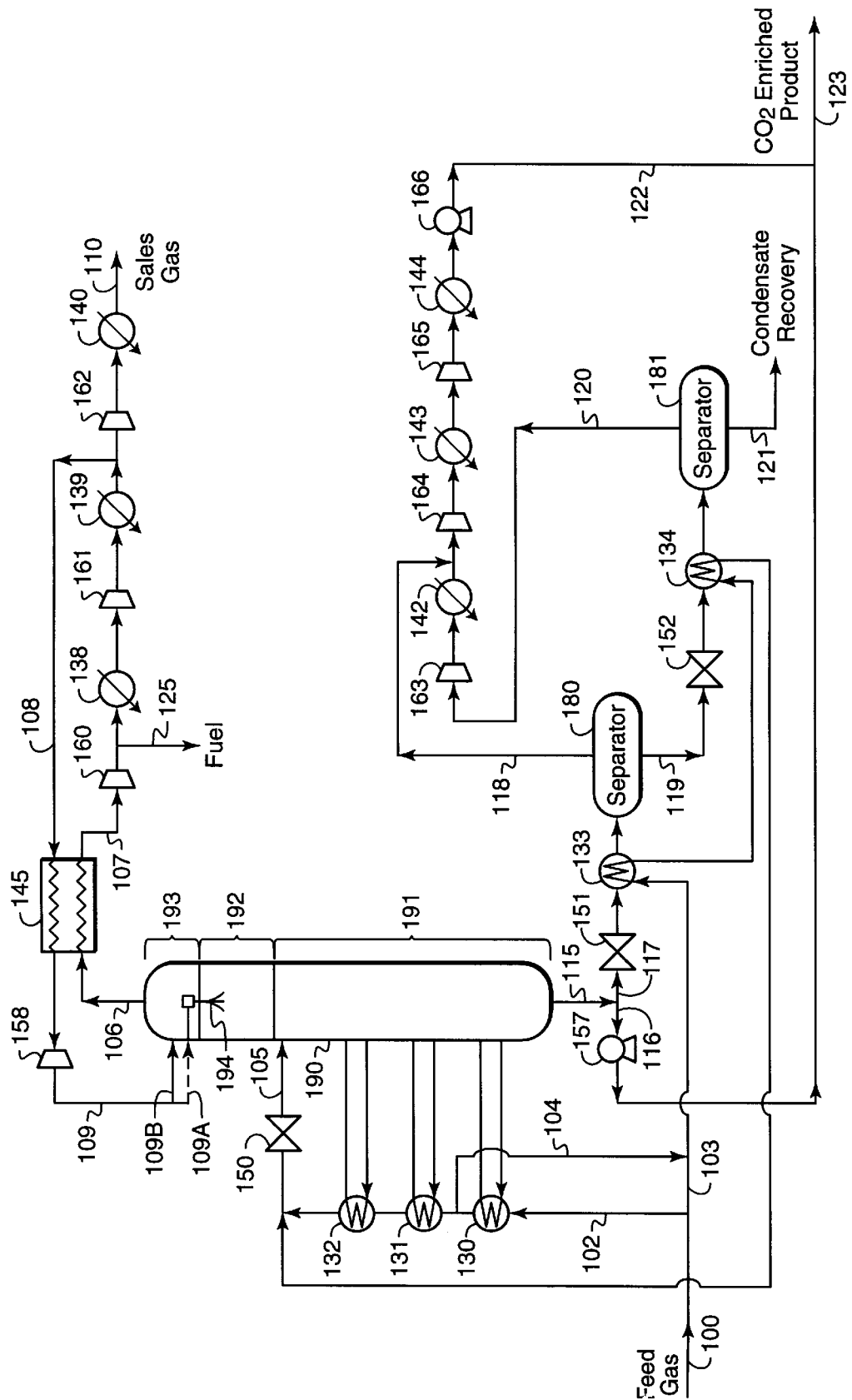
FIG. 2A is a schematic representation of one embodiment of the present invention in which carbon dioxide and methane are distillatively separated in a distillation column having a CFZ.

FIG. 2A describes use of an open-loop refrigeration system in a process using a CFZ in a distillation column 190 to handle any solids. Apparatus for a suitable CFZ distillation column 190 for use in the practice of this invention can be designed by those skilled in the art. Examples of CFZ columns are disclosed in U.S. Pat. Nos. 4,533,372; 4,923,493; 5,062,270; 5,120,338; and 5,265,428 and in a Society of Petroleum Engineers paper presented at the SPE Gas Technology Symposium in Dallas, Tex., Jun. 13–15, 1988 (SPE 17757).

For the process illustrated in FIG. 2A, it is assumed that one billion standard cubic feet per day (49,850 kg-moles/hr) of natural gas feed is received at a temperature of 18.3° C. (65° F.) and pressure of 6,764 kPa (981 psia). The gas contains (in mole percent) 71.1% $CO_2$, 26.6% $CH_4$, 0.4% $N_2$, 0.6% $H_2S$, and 1.3% ethane and heavier hydrocarbons. In this embodiment and the other embodiments described below, it is assumed that the feed streams are virtually free of water to prevent freeze-ups and hydrate formation from occurring in the process. Water is typically removed form natural gas upstream of the cryogenic plant by glycol dehydration (absorption) followed by molecular sieve (adsorption) bed. After dehydration, the feed stream is cooled, depressurized, and fed to distillation column 190 operating at a pressure in the range of from about 1,380 kPa (200 psia) to about 4,480 kPa (650 psia). The distillation column separates the feed into a methane-enriched vapor overhead product and a carbon dioxide-enriched liquid bottoms product. In the practice of this invention, distillation column 190 has at least two, and generally three, distinct sections: a distillation section 191, a controlled freeze zone 192 above the distillation section 191, and possibly an upper distillation section 193.

In this example, the tower feed is introduced into the upper part of the distillation section 191 through stream 105 where it undergoes typical distillation. The distillation sections 191 and 193 contain trays and/or packing and provide the necessary contact between liquids falling downward and vapors rising upward. The lighter vapors leave distillation section 191 and enter the controlled freezing zone 192. Once in the controlled freezing zone 192, the vapors contact liquid (sprayed freezing zone liquid reflux) emanating from nozzles or spray jet assemblies 194. The vapors then continue up through the upper distillation section 193. For effective separation of $CO_2$ from the natural gas stream in column 190, refrigeration is required to provide liquid traffic in the upper sections of the column 190. In the practice of this invention, the refrigeration to the upper portion of column 190 is supplied by open-loop refrigeration.

Figure 2B:
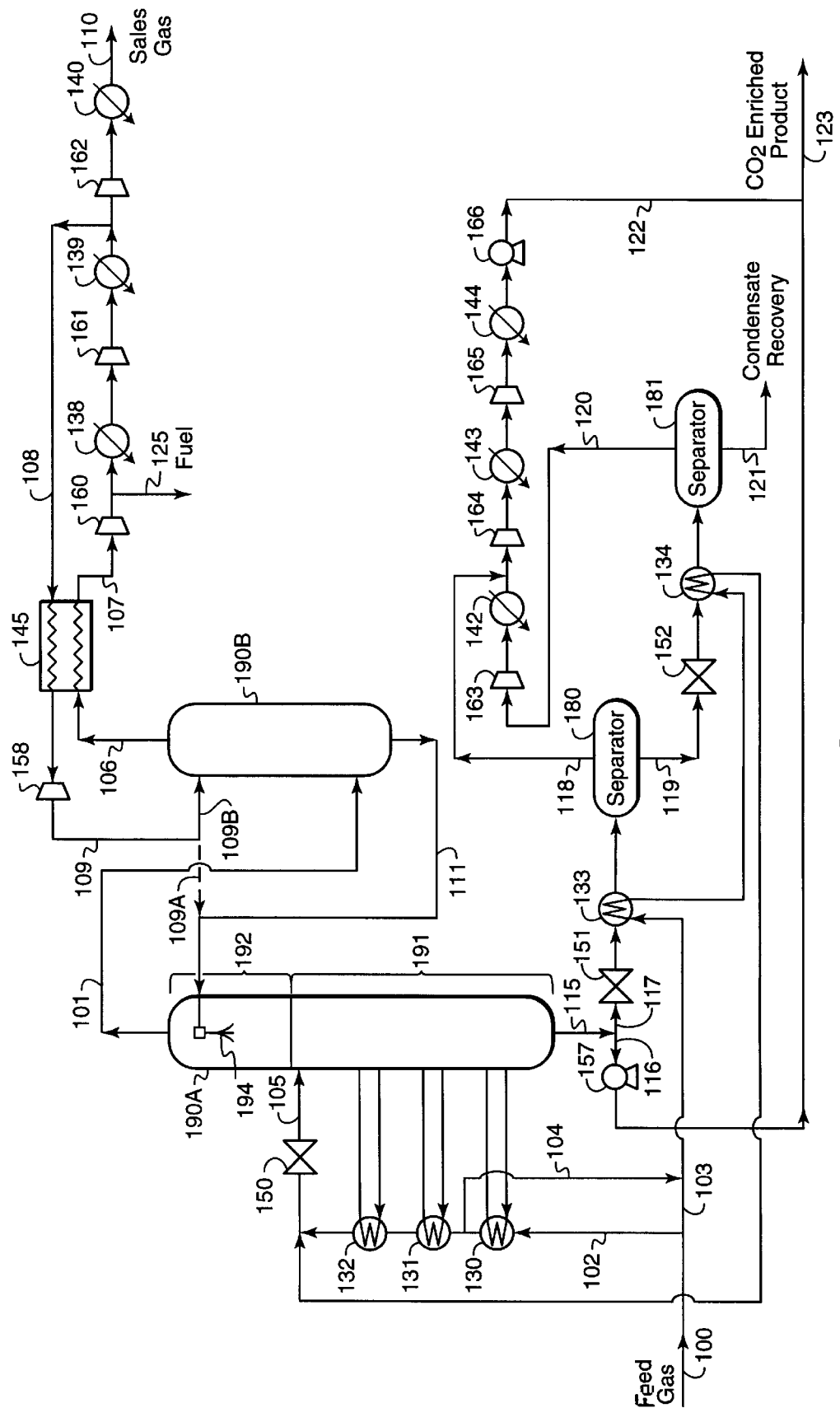
FIG. 2B is a schematic representation of the process illustrated in FIG. 2A showing a separation system having two distillation columns in the practice of this invention.

Although the separation system illustrated in FIG. 2A has only one distillation column 190, the separation system of this invention can comprise two or more distillation columns. To reduce the height of column 190, it may be desirable to split column 190 into two or more columns. For example, column 190 can be split into columns 190A and 190B as illustrated in FIG. 2B. Referring to FIG. 2B, column 190A contains two sections, a distillation section 191 and a controlled freeze zone 192 above the distillation section 191, and column 190B contains one distillation section, which performs the same function as section 193 in FIG. 2A. The liquid bottoms of column 190B can be fed by stream 111 to the upper region of column 190A. The vapor overhead of column 190A can be fed by stream 101 to the lower region of column 190B. Column 190B would have the same open-loop refrigeration cycle as that shown in FIG. 2A for column 190.

A liquid freeze suppression agent can be optionally added to stream 109 prior to entering separation column 190. Depending on the operating conditions, addition of the freeze suppression agent may be useful for operating flexibility and to assist in start-up operations. FIG. 2A does not show process streams for adding the freeze suppression agent to the stream 109, nor does FIG. 2A show process streams for recovery of the agent for recycling. Those skilled in the art can design systems to add and recover a freeze suppression agent to the process illustrated in FIG. 2A.

Referring to FIG. 2A, the incoming feed gas is divided into two streams: about 60% is directed to stream 102 and about 40% is directed to stream 103. Stream 102 is partially cooled in one or more heat exchangers. In this example, three heat exchangers 130, 131, 132 are used to cool stream 102 and to serve as reboilers to provide heat to the distillation section 191 of column 190. Stream 103 is cooled by one or more heat exchangers that are in heat exchange with one of the bottom product streams of column 190. FIG. 2A shows two heat exchangers 133 and 134 which warm bottoms products leaving the column 190. However, the number of heat exchangers for providing the feed stream cooling services will depend on a number of factors including, but not limited to, inlet gas flow rate, inlet gas composition, feed temperature, and heat exchange requirements. Optionally, although not shown in FIG. 2A, feed stream 103 may be cooled by a product stream exiting the top of column 190. As another option, the feed stream 103 may be cooled at least partially by conventional refrigeration systems, such as closed-loop propane refrigeration.

Streams 102 and 103 are recombined and the combined stream passes through an appropriate expansion means, such as a Joule-Thomson valve 150 to a pressure of approximately 2,760 kPa (400 psia), which is the operating pressure of the separation column 190. Alternatively, a turboexpander can be used in place of the Joule-Thomson valve 150. The flash expansion through valve 150 produces a cold-expanded stream 105 of −56° C. (−70° F.) which is directed to the upper part of the distillation section 191 at a point where the temperature is preferably high enough to avoid freezing.

Overhead vapor from the separation column 190 (stream 106) passes through heat exchanger 145 to warm the residue vapor stream to 60° F. (stream 107). The warmed vapor stream is recompressed by single-stage compression or a multi-stage compressor train. In this example, stream 107 passes successively through three conventional compressors 160, 161, and 162. After each compression step, the product stream is cooled by ambient air or water by after-coolers 138, 139, and 140. The compression and cooling of stream 107 produces a gas (stream 110) of 16,824 kPa (2440 psia) at a temperature of 51.7° C. (125° F.) which is suitable for sale to a natural gas pipeline. The compression of the residue gas stream 107 will usually be to a pressure that meets pipeline requirements.

A portion of stream 107 after compression by compressor 160 may optionally be withdrawn (stream 125) for use as fuel for the gas processing plant. Another portion of stream 107, about 55% of stream 107, is directed through stream 108 to heat exchanger 145, which is heat exchanged with a portion of overhead vapor stream 106, resulting in warming of stream 106 and cooling of stream 108. Stream 108 is then expanded by an appropriate expansion device, such as turbo-expander 158, to a pressure of 2,758 kPa (400 psia) and a temperature of −105° C. (−157° F.) (stream 109). Stream 109 then enters the upper portion of the separation column 190. To start up the process, stream 109 can be fed through stream 109A and sprayed into the CFZ section 192 through spray nozzle 194. After process start up, stream 109 is preferably fed (stream 109B) to the upper section 193 of the separation column 190. The discharge pressure of compressor 161 is preferably regulated to produce a pressure high enough so that the pressure drop across the expander 158 provides sufficient cooling to ensure that stream 109 is predominantly liquid, thereby providing liquid reflux to the upper portion of column 190.

A $CO_2$-enriched liquid product stream 115 exits the bottom of column 190. Stream 115 is divided into two portions, stream 116 and stream 117. One portion (stream 116) may be pumped by pump 157 to a pressure of approximately 29,650 kPa (4,300 psia) for injection into a subterranean formation. The discharge pressure of pump 157 will usually be set by the ultimate destination of the liquid product. The other portion (stream 117) is expanded by an appropriate expansion device such as expansion valve 151 and passed through heat exchanger 133 which is heat exchanged with feed stream 103, thereby cooling the feed stream. Stream 117 is then directed to separator 180, a conventional gas-liquid separation device. Vapor from separator 180 (stream 118) passes through one or more compressors and high pressure pumps to boost the pressure to the pressure needed for injection of the carbon dioxide-enriched stream. FIG. 2A shows a series of two compressors 164 and 165 and pump 166 with conventional coolers 143 and 144. Product stream 122 leaving pump 166 in the series has a pressure of 29,752 kPa (4,315 psia) and temperature which is suitable for injection into a subterranean formation.

Liquid products exiting separator 180 through stream 119 are passed through an expansion device such as expansion valve 152 and then passed through heat exchanger 134 which is in heat exchange relationship with feed stream 103, thereby cooling feed stream 103. Stream 119 is then directed to separator 181, a conventional gas-liquid separator device. Vapors from separator 181 are passed (stream 120) to a compressor 163 followed by a conventional after-cooler 142. Stream 120 is then merged with stream 118.

Stream 116 is mixed with stream 122 and may be reinjected into a subterranean formation. Splitting stream 115 into two streams, one (stream 116) to be pumped and the other (stream 117) to be used to cool the feed stream 103, is done to maximize efficiency. Optionally, the refrigeration available in stream 116 may be used elsewhere in the process. For example, stream 116 may be used for additional cooling of feed stream 102, it may be used to cool the reflux stream 108 before it enters heat exchanger 145, or it may be further processed to increase the amount of condensate recovered.

Any condensate available in stream 121 may be recovered by conventional flash or stabilization processes, and then may be sold, incinerated, or used for fuel.

Typical operating temperatures, pressures, flow rates, and compositions of flow streams at various points in the process illustrated in FIG. 2A and power requirements for compressors and pumps shown in FIG. 2A are given in Table 1. These data assumed section 191 contained 13 theoretical stages and section 193 contained four theoretical stages. The required number of stages in sections 191 and 193, as well as the required reflux rate in stream 109 and heat duty from reboilers 130, 131, and 132 are dependent on the product specifications. In this example, the specifications were 1.0 mole % methane in stream 115 and 16 ppm $H_2S$ and 0.1% $CO_2$ in stream 106. Those skilled in the art could increase or decrease the number of stages, reflux rate, and reboiler duties to meet other specifications such as 4 ppm $H_2S$ and 2% $CO_2$ in stream 106, 50 ppm $CO_2$ in stream 106, and/or 0.5% methane in stream 115. The data provided in Table 1 can be obtained using commercially available process simulation modeling programs, including for example HYSIM™, HYSYS™, PROII™, and ASPEN PLUS™, which are familiar to those of ordinary skill in the art.

vapor stream is recompressed by single-stage compression or a multi-stage compressor train. In this example, stream 212 passes successively through three conventional compressors 290, 291, and 292. After each compression step, the

TABLE 1

| Stream | Phase | Pressure Psia | Pressure kPa | Temperature °F. | Temperature °C. | Total Flow lbmole/hr | Total Flow kgmole/hr | Composition (mole % or ppm) $CO_2$ | $N_2$ | $CH_4$ | $H_2S$ | $C_2+$ |
|---|---|---|---|---|---|---|---|---|---|---|---|---|
| 101 | Vapor | 981 | 6,764 | 65 | 18.3 | 109,900 | 49,850 | 71.1 | 0.4 | 26.6 | 0.6 | 1.3 |
| 102 | Vapor | 981 | 6,764 | 65 | 18.3 | 43,400 | 19,686 | 71.1 | 0.4 | 26.6 | 0.6 | 1.3 |
| 103 | Vapor | 981 | 6,764 | 65 | 18.3 | 66,500 | 30,164 | 71.1 | 0.4 | 26.6 | 0.6 | 1.3 |
| 104 | Vapor/Liquid | 971 | 6,695 | 18 | −7.8 | 12,300 | 5,579 | 0.1 | 1.5 | 98.4 | 16 ppm | 0 |
| 105 | Vapor/Liquid | 400 | 2,758 | −70 | −56.7 | 109,900 | 49,850 | 71.1 | 0.4 | 26.6 | 0.6 | 1.3 |
| 106 | Vapor | 400 | 2,758 | −147 | −99.4 | 67,100 | 30,436 | 0.1 | 1.5 | 98.4 | 16 ppm | 0 |
| 107 | Vapor | 370 | 2,551 | 60 | 15.6 | 67,100 | 30,436 | 0.1 | 1.5 | 98.4 | 16 ppm | 0 |
| 108 | Vapor | 1,630 | 11,238 | 81 | 27.2 | 38,100 | 17,282 | 0.1 | 1.5 | 98.4 | 16 ppm | 0 |
| 109 | Liquid | 400 | 2,758 | −157 | −105.0 | 38,100 | 17,282 | 0.1 | 1.5 | 98.4 | 16 ppm | 0 |
| 110 | Vapor | 2,440 | 16,823 | 125 | 51.7 | 25,700 | 11,657 | 0.1 | 1.5 | 98.4 | 16 ppm | 0 |
| 115 | Liquid | 400 | 2,758 | 12 | −11.1 | 81,000 | 36,741 | 96.5 | 0 | 1 | 0.7 | 1.8 |
| 116 | Liquid | 400 | 2,758 | 12 | −11.1 | 14,600 | 6,622 | 96.5 | 0 | 1 | 0.7 | 1.8 |
| 117 | Liquid | 400 | 2,758 | 12 | −11.1 | 66,400 | 30,119 | 96.5 | 0 | 1 | 0.7 | 1.8 |
| 118 | Vapor | 260 | 1,793 | −8 | −22.2 | 48,000 | 21,772 | 96.8 | 0 | 1.3 | 0.7 | 1.2 |
| 119 | Liquid | 260 | 1,793 | −8 | −22.2 | 18,400 | 8,346 | 95.5 | 0 | 0.1 | 0.9 | 3.5 |
| 120 | Vapor | 90 | 621 | −10 | −23.3 | 17,800 | 8,074 | 97.8 | 0 | 0.1 | 0.9 | 1.2 |
| 121 | Liquid | 90 | 621 | −10 | −23.3 | 500 | 227 | 18.7 | 0 | 0 | 0.6 | 80.7 |
| 122 | Liquid | 4,315 | 29,751 | 150 | 65.6 | 66,000 | 29,937 | 97.1 | 0 | 1 | 0.7 | 1.2 |
| 123 | Liquid | 4,315 | 29,751 | 133 | 56.1 | 80,500 | 36,514 | 97 | 0 | 1 | 0.7 | 1.3 |
| 125 | Vapor | 820 | 5,654 | 198 | 92.2 | 3,100 | 1,406 | 0.1 | 1.5 | 98.4 | 16 ppm | 0 |

| Power Requirements | Power, hp | Power, kW |
|---|---|---|
| Compressors | | |
| 160 | 29,870 | 22,274 |
| 161 | 25,010 | 18,650 |
| 162 | 5,270 | 3,930 |
| 163 | 9,690 | 7,226 |
| 164 | 26,140 | 19,493 |
| 165 | 21,430 | 15,981 |
| Pumps | | |
| 157 | 19,020 | 14,183 |
| 166 | 4,010 | 2,990 |
| Subtotal | 140,440 | 104,728 |
| Expander | | |
| 158 | −1,880 | −1,402 |
| Total | 138,560 | 103,326 |

Figure 3:
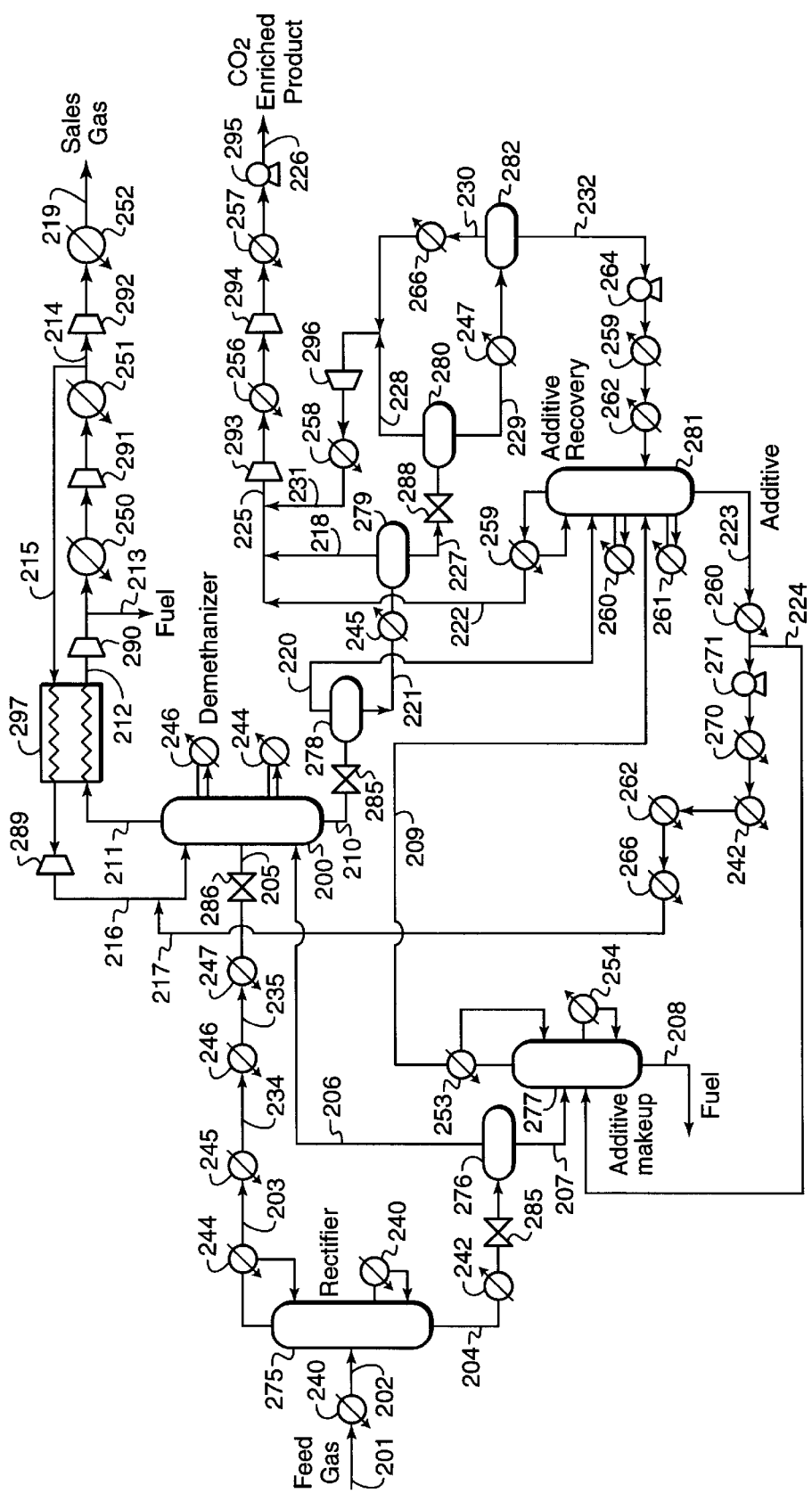
FIG. 3 is a schematic representation of another embodiment of the present invention in which carbon dioxide and methane are distillatively separated using a distillative system without a CFZ in which an additive is introduced to the separation system to suppress freezing of $CO_2$.

Referring to FIG. 3, a feed gas stream 201 (containing 71.2% $CO_2$, 27% $CH_4$, 0.5% $H_2S$, 0.4% $N_2$ and 0.9% ethane and heavier hydrocarbons) is cooled in heat exchanger 240 and fed into separation column 275. Separation column 275 is a rectifier that removes wax components (long chain n-paraffin hydrocarbons) that may be contained in gas stream 201. Overhead vapor from separation column 275 passes through a series of heat exchangers 244, 245, 246, and 247 to cool the vapor before it enters a Joule-Thomson expansion valve 286. The gas stream exiting expansion valve 286 (stream 205) is fed into fractionation column 200, which is also called a demethanizer. Liquids exiting the bottom of separation column 275 (stream 204) pass through heat exchanger 242 before entering Joule-Thomson expansion valve 285. The gas stream exiting valve 285 enters separator 276. Vapors exiting the top of separator 276 are directed (stream 206) to demethanizer 200.

Overhead vapor from the demethanizer 200 (stream 211) passes through heat exchanger 297 to warm the residue vapor stream to −3.9° C. (25° F.) (stream 212). The warmed vapor stream is recompressed by single-stage compression or a multi-stage compressor train. In this example, stream 212 passes successively through three conventional compressors 290, 291, and 292. After each compression step, the product stream is cooled by ambient air or water by aftercoolers 250, 251, and 252. The compression and cooling of stream 212 produces a gas (stream 219) of 19,444 kPa (2,820 psia) at a temperature of 51.7° C. (125° F.) which is suitable for sale to a natural gas pipeline. The compression of the residue gas stream 219 will typically be to a pressure that meets pipeline requirements.

A portion of stream 212 after compression by compressor 290 may be withdrawn for use as fuel (stream 213) for the gas processing plant. Another portion of stream 212, about 40% of stream 212, is directed as stream 215 to heat exchanger 297, which is heat exchanged with overhead vapor stream 211, resulting in warming of stream 211 and cooling of stream 215. Stream 215 is then expanded by an appropriate expansion device, such as turbo-expander 289, to a pressure of 4,826 kPa (700 psia) and a temperature of −79.4° C. (−111° F.) (stream 216). The pressure of the expanded stream 216 is sufficient to prevent freezing of $CO_2$. The discharge pressure of compressor 291 is regulated to produce a temperature in stream 216 that is low enough for stream 216 to be predominantly liquid.

A freeze suppressing additive from stream 217 is added preferably to stream 216 before stream 216 is fed to the upper portion of demethanizer 200. Although not shown in FIG. 3, stream 217 may be introduced directly into the upper region of demethanizer 200 if the freeze suppression additive is not needed to control solids formation in stream 216. The additive can be an external additive or, in the alternative, can be one or more recycled components from the bottoms product taken from the demethanizer 200. The additive suppresses freezing of $CO_2$ in demethanizer 200.

The freeze suppression additive can be materials that reduce the freezing potential of the freezable component of the feed stream. Non-limiting examples of such additives may include ethane, propane, butane, pentane, and higher hydrocarbons, methanol, ethanol, and glycol, or mixtures thereof.

The amount of freeze suppressing additive will depend upon factors such as the composition of the feed, operating pressure, throughput of the demethanizer 200, and the type of additive selected. The amount additive needed to suppress freezing of $CO_2$ can be determined by those skilled in the art of cryogenic distillative processing using commercially available simulation software such as the modeling programs referenced above.

Additional freeze suppression additive is supplied by separation column 277, which is referred to as the additive make-up column. The liquid stream 207 is fed to the additive make-up column and separated into fuel oil stream 208 and an additive make-up stream 209.

Liquids exiting the bottom of demethanizer 200 pass through an expansion valve 285. The expanded, largely vapor stream exiting expansion valve 285 then passes to separator 278. An overhead vapor stream exiting separator 278 is fed to a separation tower 281 for recovery of the freeze suppression additive. Liquid exiting separator 278 (stream 221) is then warmed by heat exchanger 245, which cools the feed stream 203. From heat exchanger 245, the partially vaporized liquid stream is fed to another separator 279. Liquid from separator 279 passes through expansion valve 288. The predominantly vapor product exiting the Joule-Thomson expansion 288 is then passed to another separator 280. Liquid exiting separator 280 (stream 229) is warmed by heat exchanger 247 which also cools feed stream 235. The partially vaporized liquid stream exiting heat exchanger 247 is then fed to still another separator 282.

Liquid exiting separator 282 is pumped by pump 264 through heat exchangers 259 and 262 and then fed to separation column 281, which is referred to as the additive recovery column.

Vapor stream 218 exiting separator 279 is merged with vapor stream 222 from separation column 281 and passed through compressors 293 and 294, and pump 295, and coolers 256 and 257 to increase the pressure of the $CO_2$ to a pressure suitable for injection (stream 226) into a subterranean formation.

Overhead vapor from separator 282 is passed (stream 230) through heat exchanger 266 and merged with overhead vapor (stream 228) from separator 280. The combined vapor stream then passes through compressor 296 and cooler 258 (stream 231) and merges with streams 222 and 218.

The liquid freeze suppression additive exiting the bottom of separation column 281 passes through heat exchanger 260. A portion of the liquid stream exiting heat exchanger 260 may be withdrawn from the process through line 224 and directed to separation column 277 (the additive make-up column). The remaining liquid is pumped by pump 271 through a series of heat exchangers 270, 242, 262, and 266 before being fed (stream 217) to stream 216.

Separation column 275, separation column 277 and separation column 281 all recycle (reflux) a portion of the overhead vapor streams back to the top portion of the columns. Heat exchangers (244, 253, and 259) in the recycle loops cool the reflux streams. The bottom portions of columns 275, 277 and 281 are reboiled by a recycling streams which are heat exchanged (heat exchangers 240, 254 and 261) with warming heat sources, such as feed stream 201 for column 275 and an external heat source, such as heating oil, for columns 277 and 281. Separation column 281 is additionally reboiled by side reboiler 260.

Typical operating temperatures, pressures, flow rates, and compositions of flow streams at various points in the process illustrated in FIG. 3 and power requirements for compressor and pumps shown in FIG. 3 are given in Table 2. In this example, it was assumed that separation column 275 had 11 theoretical stages, demethanizer 200 had 19 theoretical stages, column 277 had 13 theoretical stages, and column 281 had 17 theoretical stages. The data provided in Table 2 can be obtained using commercially available process simulation modeling programs, which are familiar to those of ordinary skill in the art.

TABLE 2

| Stream Phase | Pressure | | Temperature | | Total Flow | | Composition (mole % or ppm) | | | | |
|---|---|---|---|---|---|---|---|---|---|---|---|
| | psia | kPa | ° F. | ° C. | lbmole/hr | kgmole/hr | $CO_2$ | $N_2$ | $CH_4$ | $H_2S$ | $C_2$ + |
| 201 Vapor | 995 | 6,860 | 66 | 18.9 | 108,200 | 49,079 | 71.2 | 0.4 | 27 | 0.5 | 0.9 |
| 202 Vapor | 990 | 6,826 | 61 | 16.1 | 108,200 | 49,079 | 71.2 | 0.4 | 27 | 0.5 | 0.9 |
| 203 Vapor/Liquid | 975 | 6,722 | 37 | 2.8 | 105,100 | 47,673 | 70.9 | 0.4 | 27.4 | 0.5 | 0.8 |
| 204 Liquid | 985 | 6,791 | 51 | 10.6 | 3,000 | 1,361 | 83.4 | 0.1 | 11.1 | 0.8 | 4.6 |
| 205 Vapor/Liquid | 450 | 3,103 | −73 | −58.3 | 105,100 | 47,673 | 70.9 | 0.4 | 27.4 | 0.5 | 0.8 |
| 206 Vapor | 485 | 3,344 | 40 | 4.4 | 2,700 | 1,225 | 86 | 0.1 | 0 | 0.8 | 1.1 |
| 207 Liquid | 485 | 3,344 | 40 | 4.4 | 300 | 136 | 57.7 | 0 | 2.2 | 1.2 | 38.9 |
| 208 Liquid | 310 | 2,137 | 541 | 282.8 | 100 | 45 | 0 | 0 | 0 | 0 | 100 |
| 209 Vapor | 300 | 2,068 | 294 | 145.6 | 300 | 136 | 53.7 | 0 | 2.1 | 1.5 | 43.1 |
| 210 Liquid | 460 | 3,172 | 25 | −3.9 | 80,100 | 36,333 | 92.9 | 0 | 1 | 0.7 | 5.4 |
| 211 Liquid | 450 | 3,103 | −98 | −72.2 | 52,700 | 23,904 | 8 | 1.4 | 90.5 | 16 ppm | 0 |
| 212 Vapor | 440 | 3,034 | 26 | −3.3 | 52,700 | 23,904 | 8 | 1.4 | 90.5 | 16 ppm | 0 |
| 213 Vapor | 760 | 5,240 | 113 | 45.0 | 500 | 227 | 8 | 1.4 | 90.5 | 16 ppm | 0 |
| 214 Vapor | 1,290 | 8,894 | 82 | 27.8 | 30,800 | 13,971 | 8 | 1.4 | 90.5 | 16 ppm | 0 |
| 215 Vapor | 1,290 | 8,894 | 82 | 27.8 | 21,400 | 9,707 | 8 | 1.4 | 90.5 | 16 ppm | 0 |
| 216 Liquid | 700 | 4,826 | −111 | −79.4 | 21,400 | 9,707 | 8 | 1.4 | 90.5 | 16 ppm | 0 |
| 217 Liquid | 720 | 4,964 | −55 | −48.3 | 3,600 | 1,633 | 8 | 1.4 | 90.5 | 16 ppm | 0 |

TABLE 2-continued

| | | | | | | | | | | | |
|---|---|---|---|---|---|---|---|---|---|---|---|
| 218 Vapor | 285 | 1,965 | 2 | -16.7 | 39,800 | 18,053 | 97.5 | 0 | 0.8 | 0.6 | 1.1 |
| 219 Vapor | 2,820 | 19,443 | 125 | 51.7 | 30,800 | 13,971 | 8 | 1.4 | 90.5 | 16 ppm | 0 |
| 220 Vapor | 290 | 1,999 | -2 | -18.9 | 10,600 | 4,808 | 93.7 | 0 | 4.4 | 0.6 | 1.3 |
| 221 Liquid | 290 | 1,999 | -2 | -18.9 | 69,600 | 31,570 | 92.8 | 0 | 0.4 | 0.8 | 6 |
| 222 Vapor | 285 | 1,965 | -4 | -20.0 | 16,700 | 7,575 | 94.6 | 0 | 2.8 | 1.1 | 1.5 |
| 223 Liquid | 290 | 1,999 | 394 | 201.1 | 3,700 | 1,678 | 0 | 0 | 0 | 0 | 100 |
| 224 Liquid | 290 | 1,999 | 225 | 107.2 | 100 | 45 | 0 | 0 | 0 | 0 | 100 |
| 225 Vapor | 280 | 1,931 | 20 | -6.7 | 76,700 | 34,791 | 97.1 | 0 | 1.1 | 0.8 | 1 |
| 226 Liquid | 4,315 | 29,751 | 148 | 64.4 | 76,700 | 34,791 | 97.1 | 0 | 1.1 | 0.8 | 1 |
| 227 Liquid | 285 | 1,965 | 2 | -16.7 | 29,800 | 13,517 | 86.4 | 0 | 0.1 | 0.9 | 12.6 |
| 228 Vapor | 83 | 572 | -62 | -52.2 | 6,600 | 2,994 | 98 | 0 | 0.4 | 0.7 | 0.9 |
| 229 Liquid | 83 | 572 | -62 | -52.2 | 23,200 | 10,523 | 83 | 0 | 0 | 1 | 16 |
| 230 Vapor | 80 | 548 | -62 | -52.2 | 13,600 | 6,169 | 98.5 | 0 | 0 | 0.8 | 0.7 |
| 231 Vapor | 280 | 1,931 | 82 | 27.8 | 20,200 | 9,163 | 98.3 | 0 | 0.1 | 0.7 | 0.9 |
| 232 Liquid | 80 | 548 | -62 | -52.2 | 9,600 | 4,354 | 60.3 | 0 | 0 | 1.3 | 38.4 |
| 234 Vapor/Liquid | 965 | 6,653 | 4 | -15.6 | 105,100 | 47,673 | 70.9 | 0.4 | 27.4 | 0.5 | 0.8 |
| 235 Liquid | 960 | 6,619 | -21 | -29.4 | 105,100 | 47,673 | 70.9 | 0.4 | 27.4 | 0.5 | 0.8 |

Power Requirements

| | | Power, hp | Power, kW |
|---|---|---|---|
| Compressors | | | |
| 290 | | 14,070 | 10,492 |
| 291 | | 15,320 | 11,424 |
| 292 | | 13,010 | 9,702 |
| 296 | | 12,690 | 9,463 |
| 293 | | 25,890 | 19,306 |
| 294 | | 27,700 | 20,656 |
| Pumps | | | |
| 264 | | 200 | 149 |
| 271 | | 340 | 254 |
| 295 | | 21,140 | 15,764 |
| | Subtotal | 130,360 | 97,211 |
| Expander | | | |
| 289 | | -680 | -507 |
| | Total | 129,680 | 96,704 |

Figure 4:
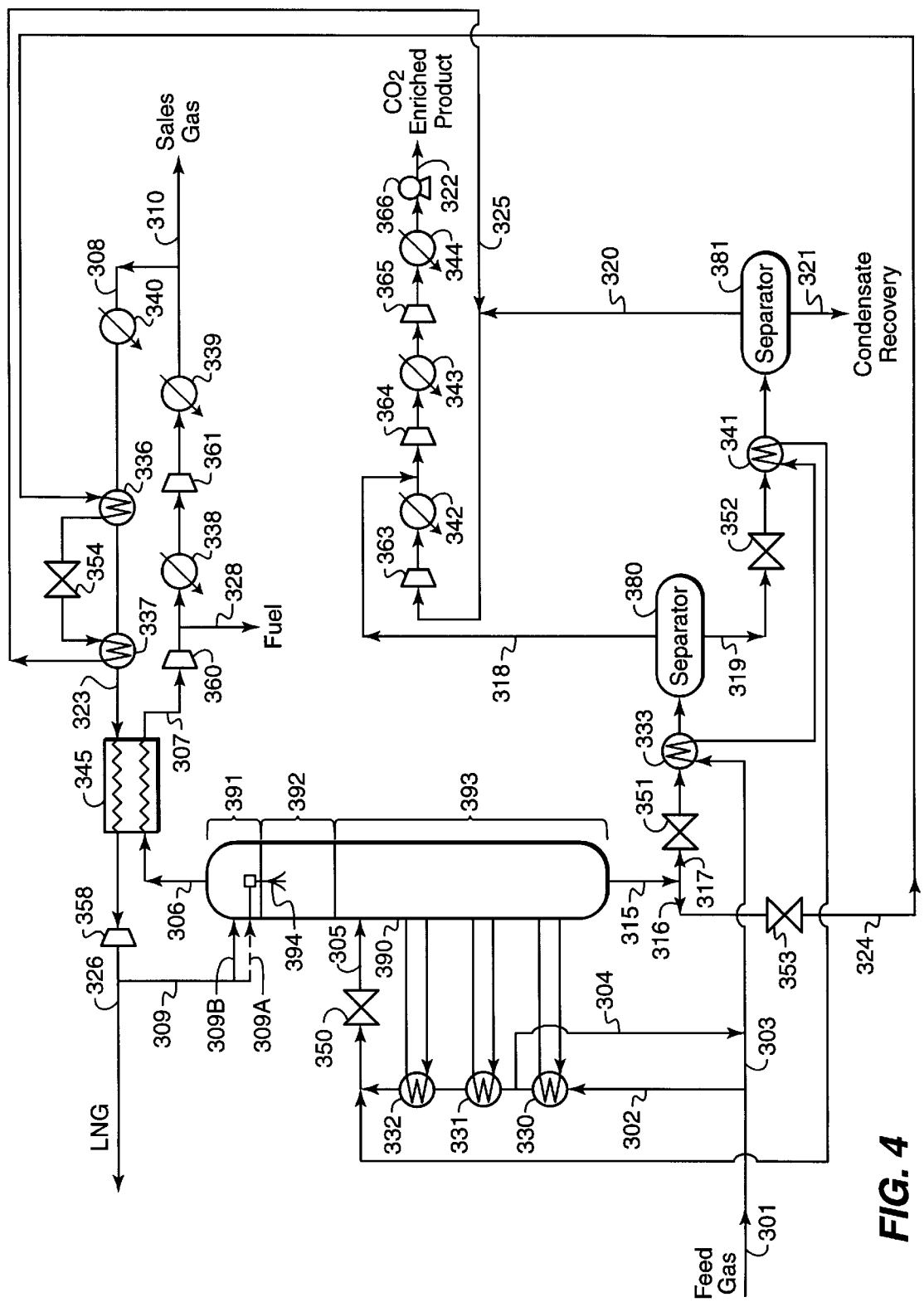
FIG. 4 is a schematic representation of still another embodiment of the present invention in which carbon dioxide and methane are distillatively separated in a distillation column having a CFZ in which one overhead product stream is high pressure liquid natural gas (LNG) and another overhead product stream is sales gas.

FIG. 4 illustrates in schematic form another embodiment of this invention in which the process of this invention produces both liquefied natural gas (LNG) and sales gas as product streams. The process shown in FIG. 4 is similar to the process described above in FIG. 2A. In this embodiment, the overhead product streams are 50% LNG (stream 326) and 50% sales gas (stream 310). However, additional LNG, up to 100%, could be produced by providing additional cooling from either heat exchange with colder fluids or additional pressure drop at the expander through the installation of additional compression and after-coolers. Likewise, less LNG could be produced by providing less cooling. Referring to FIG. 4, feed stream 301 has the same temperature, pressure, and composition as feed stream 100 in the process illustrated in FIG. 2A. Also, the feed stream is treated in to same manner before entering distillation column 390 as the feed stream 100 was treated in the process described in FIG. 2A before entering column 190.

Overhead vapor from the separation column 390 (stream 306) passes through heat exchanger 345 to warm the residue vapor stream to -30.6° C. (-23° F.) (stream 307). The warmed vapor stream is recompressed by single-stage compression or a multi-stage compressor train. In this example, stream 307 passes successively through two conventional compressors 360 and 361. After each compression step, the product stream is cooled by ambient air or water by after-coolers 338 and 339. The compression and cooling of stream 307 produces a gas of 16,824 kPa (2440 psia) at a temperature of 51.7° C. (125° F.) which is suitable for sale to a natural gas pipeline or further processing. The compression of the residue gas stream 307 will usually be to at least a pressure that meets pipeline requirements.

A portion of stream 307 after passing through compressor 360 is withdrawn (stream 328) for use as fuel for the gas processing plant. Another portion of stream 307 (about 75% of stream 307) is directed through stream 308 to heat exchangers 340, 336 and 337. In order to produce additional LNG, additional compression could be installed after compressor 360 and before heat exchanger 336. Stream 308 is cooled in heat exchangers 336 and 337 with cold fluids from stream 324 exiting the bottom of column 390. Stream 308 is then heat exchanged in exchanger 345 with a portion of overhead vapor stream 306, resulting in warming of stream 306 and further cooling of stream 308. Stream 308 is then expanded by an appropriate expansion device, such as turbo-expander 358, to a pressure of 2,758 kPa (400 psia) and a temperature of -101.7° C. (-151° F.) (stream 309). Stream 308 then splits, one portion (about 24%) is passed as LNG product (stream 326) at a temperature of -101.7° C. (-151° F.) and a pressure of 2,758 kPa (400 psia) for storage or transportation, for conversion to low pressure LNG, or any other desired use. The other portion (stream 309) enters separation column 390. The discharge pressure of compressor 361 is regulated to produce a pressure that is high enough so that the pressure drop across the expander 358 provides sufficient cooling to ensure that streams 309 and 326 are predominantly liquid enriched in methane. To start up the process, stream 309 is preferably fed through stream 309A and sprayed directly into the CFZ section 392 through spray nozzle 394. After process start up, stream 309 may be fed (stream 309B) to the upper section 391 of the separation column 390.

A liquid product stream 315 exits the bottom of column 390. Stream 315 is divided into two portions, stream 316 and stream 317. One portion (stream 316) passes through an appropriate expansion device, such as a Joule-Thomson valve 353 to a pressure of approximately 1,930 psia (280 psia). Stream 324 that exits valve 353 is then warmed in heat exchanger 336 and stream 324 passes through another Joule-Thomson valve 354 and still another heat exchanger 337. The resulting stream 325 is then merged with vapor stream 320 from separator 381.

The other portion of the liquid stream exiting column 390 (stream 317) is treated in the same manner as stream 117 as described above for the process illustrated in FIG. 2A. Stream 318 is merged with stream 320 and 325 downstream of cooler 342. Streams 320, and 325 are merged as shown in FIG. 4 and passed through a series of compressors 363, 364, and 365, pump 366, and coolers 342 and 343, and 344 to produce a product stream 322 at 29,752 kPa (4,315 psia) and at a temperature that is suitable for injection into a subterranean formation.

Any condensate available in stream 321 may be recovered by conventional flash or stabilization processes, and then may be sold, incinerated, or used for fuel.

Typical operating temperatures, pressures, flow rates, and compositions of flow streams at various points in the process illustrated in FIG. 4 and power requirements for compressors and pumps shown in FIG. 4 are given in Table 3. In this example, column 390 was assumed to have the same configuration as column 190 of FIG. 1 to develop the data of Table 1. The overhead product streams were 50% LNG (stream 326) and 50% sales gas (stream 310). The data provided in Table 3 can be obtained using commercially available process simulation modeling programs referenced above.

TABLE 3

| Stream Phase | Pressure | | Temperature | | Total Flow | | Composition (mole % or ppm) | | | | |
|---|---|---|---|---|---|---|---|---|---|---|---|
| | psia | kPa | °F. | °C. | lbmole/hr | kgmole/hr | $CO_2$ | $N_2$ | $CH_4$ | $H_2S$ | $C_2+$ |
| 301 Vapor | 981 | 6,764 | 65 | 18.3 | 109,900 | 49,850 | 71.1 | 0.4 | 26.6 | 0.6 | 1.3 |
| 302 Vapor | 981 | 6,764 | 65 | 18.3 | 43,500 | 19,731 | 71.1 | 0.4 | 26.6 | 0.6 | 1.3 |
| 303 Vapor | 981 | 6,764 | 65 | 18.3 | 66,400 | 30,119 | 71.1 | 0.4 | 26.6 | 0.6 | 1.3 |
| 304 Vapor/Liquid | 971 | 6,695 | 18 | −7.8 | 13,100 | 5,942 | 71.1 | 0.4 | 26.6 | 0.6 | 1.3 |
| 305 Vapor/Liquid | 400 | 2,758 | −70 | −56.7 | 109,900 | 49,850 | 71.1 | 0.4 | 26.6 | 0.6 | 1.3 |
| 306 Vapor | 400 | 2,758 | −147 | −99.4 | 68,600 | 31,116 | 0.1 | 1.5 | 98.4 | 16 ppm | 0 |
| 307 Vapor | 370 | 2,551 | −23 | −30.6 | 68,600 | 31,116 | 0.1 | 1.5 | 98.4 | 16 ppm | 0 |
| 308 Vapor | 2,440 | 16,823 | 125 | 51.7 | 52,300 | 23,723 | 0.1 | 1.5 | 98.4 | 16 ppm | 0 |
| 309 Liquid | 400 | 2,758 | −151 | −101.7 | 39,700 | 18,008 | 0.1 | 1.5 | 98.4 | 16 ppm | 0 |
| 310 Vapor | 2,440 | 16,823 | 125 | 51.7 | 12,600 | 5,715 | 0.1 | 1.5 | 98.4 | 16 ppm | 0 |
| 315 Liquid | 400 | 2,758 | 12 | −11.1 | 81,000 | 36,741 | 96.5 | 0 | 1 | 0.7 | 1.8 |
| 316 Liquid | 400 | 2,758 | 12 | −11.1 | 14,400 | 6,532 | 96.5 | 0 | 1 | 0.7 | 1.8 |
| 317 Liquid | 400 | 2,758 | 12 | −11.1 | 66,600 | 30,209 | 96.5 | 0 | 1 | 0.7 | 1.8 |
| 318 Vapor | 270 | 1,862 | −6 | −21.1 | 47,900 | 21,727 | 96.8 | 0 | 1.3 | 0.7 | 1.2 |
| 319 Liquid | 270 | 1,862 | −6 | −21.1 | 18,700 | 8,482 | 95.5 | 0 | 0.1 | 0.9 | 3.5 |
| 320 Vapor | 90 | 621 | −10 | −23.3 | 18,100 | 8,210 | 97.8 | 0 | 0.1 | 0.9 | 1.2 |
| 321 Liquid | 90 | 621 | −10 | −23.3 | 500 | 227 | 18.7 | 0 | 0 | 0.6 | 80.7 |
| 322 Liquid | 4,315 | 29,751 | 150 | 65.6 | 80,500 | 36,514 | 97 | 0 | 1 | 0.7 | 1.3 |
| 323 Vapor | 2,410 | 16,616 | −19 | −28.3 | 52,300 | 23,723 | 0.1 | 1.5 | 98.4 | 16 ppm | 0 |
| 324 Vapor/Liquid | 280 | 1,931 | −8 | −22.2 | 14,400 | 6,532 | 96.5 | 0 | 1 | 0.7 | 1.8 |
| 325 Vapor | 90 | 621 | −8 | −22.2 | 14,400 | 6,532 | 96.5 | 0 | 1 | 0.7 | 1.8 |
| 326 Liquid | 400 | 2,758 | −151 | −101.7 | 12,600 | 5,715 | 0.1 | 1.5 | 98.4 | 16 ppm | 0 |
| 328 Vapor | 1,000 | 6,895 | 133 | 56.1 | 3,600 | 1,633 | 0.1 | 1.5 | 98.4 | 16 ppm | 0 |

Power Requirements

| | Power, hp | Power, kW |
|---|---|---|
| Compressors | | |
| 360 | 31,450 | 23,453 |
| 361 | 33,270 | 24,810 |
| 363 | 17,530 | 13,072 |
| 364 | 33,170 | 24,735 |
| 365 | 26,090 | 19,456 |
| Pump | | |
| 366 | 23,090 | 17,218 |
| Subtotal | 164,600 | 122,744 |
| Expander | | |
| 358 | −4,280 | −3,192 |
| Total | 160,320 | 119,553 |

The amount of sales gas (stream 310) withdrawn versus the amount of LNG withdrawn (stream 326) from the recycle loop will depend on operating conditions and the commercial need for the products. The amount of LNG produced can be increased by providing additional cooling from either heat exchange with colder fluids or additional pressure drop at the expander 358 by installing additional compression and after-coolers, which may be installed after compressor 360 and before heat exchanger 336. Likewise, less LNG could be produced through the use of less cooling. The amount of compression and heat exchange needed to adjust the amount of LNG produced in the process of this invention can be determined by those skilled in the art.

Figure 5:
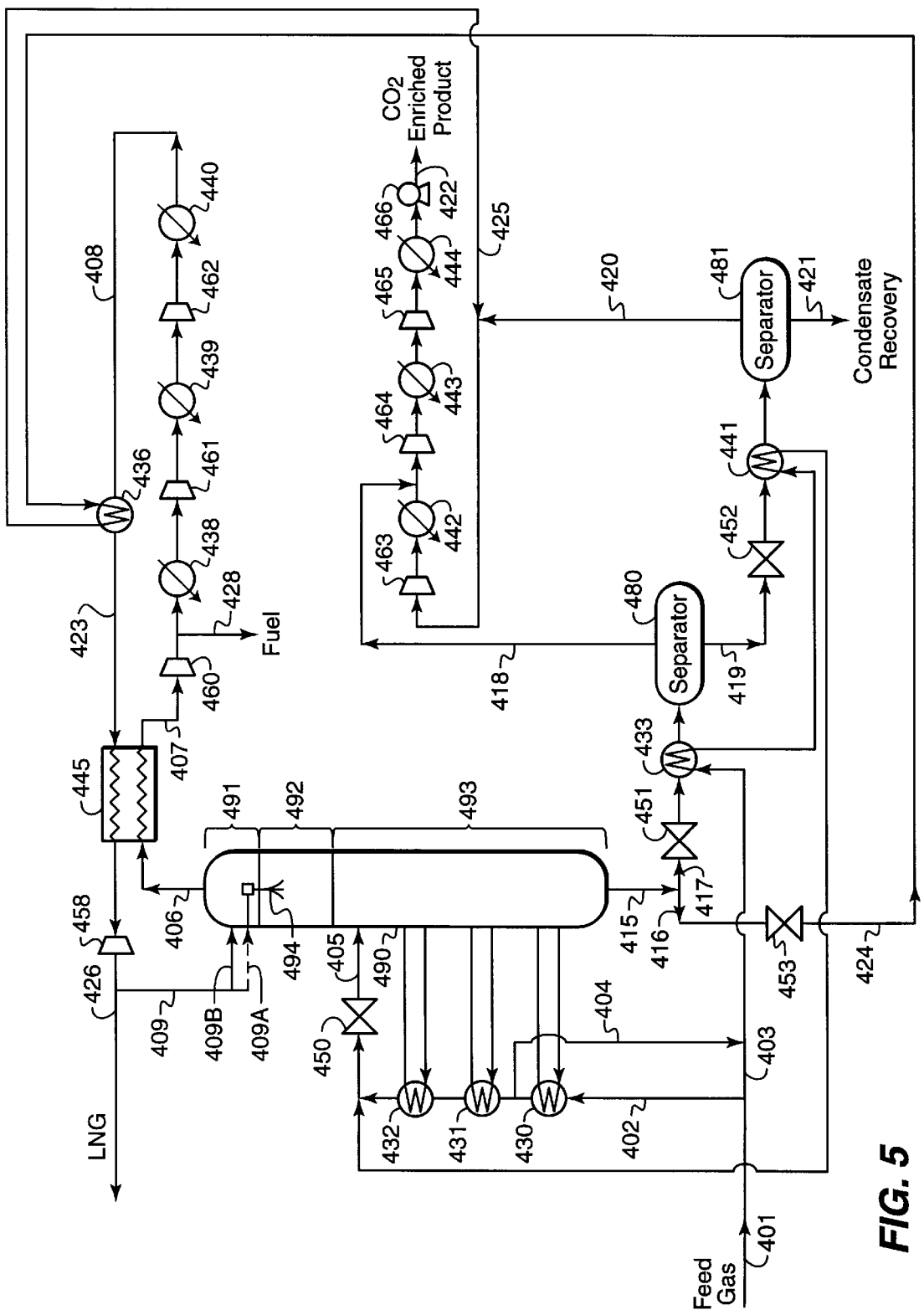
FIG. 5 is a schematic representation similar to the process illustrated in FIG. 4 except that the only overhead product stream is high pressure LNG.

FIG. 5 illustrates an example of the process of this invention in which all of the product stream recovered from the reflux cycle is LNG. Table 4 provides typical operating temperatures, pressures, flow rates, and compositions of flow streams at various points in the process illustrated in FIG. 5 and power requirements for compressors and pumps.

cooling with colder fluids, by additional compression, or by both increasing the cooling and by compression.

Although the detailed description of this invention illustrates a separation system containing a CFZ or a conventional distillative column using a freeze suppression additive, or a combination of both, this invention is not limited to the separation systems disclosed herein. The scope of the separation systems is limited only by the appended claims.

TABLE 4

| Stream Phase | Pressure | | Temperature | | Total Flow | | Composition (mole % or ppm) | | | | |
|---|---|---|---|---|---|---|---|---|---|---|---|
| | Psia | kPa | ° F. | ° C. | lbmole/hr | kgmole/hr | $CO_2$ | $N_2$ | $CH_4$ | $H_2S$ | $C_2+$ |
| 401 Vapor | 981 | 6,764 | 65 | 18.3 | 109,900 | 49,850 | 71.1 | 0.4 | 26.6 | 0.6 | 1.3 |
| 402 Vapor | 981 | 6,764 | 65 | 18.3 | 43,400 | 19,686 | 71.1 | 0.4 | 26.6 | 0.6 | 1.3 |
| 403 Vapor | 981 | 6,764 | 65 | 18.3 | 66,500 | 30,164 | 71.1 | 0.4 | 26.6 | 0.6 | 1.3 |
| 404 Vapor/Liquid | 971 | 6,695 | 18 | −7.8 | 12,300 | 5,579 | 71.1 | 0.4 | 26.6 | 0.6 | 1.3 |
| 405 Vapor/Liquid | 400 | 2,758 | −70 | −56.7 | 109,900 | 49,850 | 71.1 | 0.4 | 26.6 | 0.6 | 1.3 |
| 406 Vapor | 400 | 2,758 | −147 | −99.4 | 69,300 | 31,434 | 0.1 | 1.5 | 98.4 | 16 ppm | 0 |
| 407 Vapor | 370 | 2,551 | −23 | −30.6 | 69,300 | 31,434 | 0.1 | 1.5 | 98.4 | 16 ppm | 0 |
| 408 Vapor | 2,440 | 16,823 | 125 | 51.7 | 65,300 | 29,620 | 0.1 | 1.5 | 98.4 | 16 ppm | 0 |
| 409 Liquid | 400 | 2,758 | −151 | −101.7 | 40,300 | 18,280 | 0.1 | 1.5 | 98.4 | 16 ppm | 0 |
| 415 Liquid | 400 | 2,758 | 12 | −11.1 | 81,000 | 36,741 | 96.5 | 0 | 1 | 0.7 | 1.8 |
| 416 Liquid | 400 | 2,758 | 12 | −11.1 | 14,300 | 6,486 | 96.5 | 0 | 1 | 0.7 | 1.8 |
| 417 Liquid | 400 | 2,758 | 12 | −11.1 | 67,000 | 30,391 | 96.5 | 0 | 1 | 0.7 | 1.8 |
| 418 Vapor | 270 | 1,862 | −6 | −21.1 | 48,300 | 21,909 | 96.8 | 0 | 1.3 | 0.7 | 1.2 |
| 419 Liquid | 270 | 1,862 | −6 | −21.1 | 18,700 | 8,482 | 95.5 | 0 | 0.1 | 0.9 | 3.5 |
| 420 Vapor | 90 | 621 | −10 | −23.3 | 18,100 | 8,210 | 97.8 | 0 | 0.1 | 0.9 | 1.2 |
| 421 Liquid | 90 | 621 | −10 | −23.3 | 500 | 227 | 18.7 | 0 | 0 | 0.6 | 80.7 |
| 422 Liquid | 4,315 | 29,751 | 150 | 65.6 | 80,500 | 36,514 | 97 | 0 | 1 | 0.7 | 1.3 |
| 423 Vapor | 3,680 | 25,373 | −16 | −26.7 | 65,300 | 29,620 | 0.1 | 1.5 | 98.4 | 16 ppm | 0 |
| 424 Vapor/Liquid | 100 | 689 | −58 | −50.0 | 14,300 | 6,486 | 96.5 | 0 | 1 | 0.7 | 1.8 |
| 425 Vapor | 90 | 621 | −75 | −59.4 | 14,300 | 6,486 | 96.5 | 0 | 1 | 0.7 | 1.8 |
| 426 Liquid | 400 | 2,758 | −151 | −101.7 | 25,100 | 11,385 | 0.1 | 1.5 | 98.4 | 16 ppm | 0 |
| 428 Vapor | 1,000 | 6,895 | 137 | 58.3 | 3,800 | 1,724 | 0.1 | 1.5 | 98.4 | 16 ppm | 0 |

| Power Requirements | | |
|---|---|---|
| | Power, hp | Power, kW |
| Compressors | | |
| 460 | 32,090 | 23,930 |
| 461 | 33,410 | 24,914 |
| 462 | 13,650 | 10,179 |
| 463 | 19,320 | 14,407 |
| 464 | 33,170 | 24,735 |
| 465 | 26,100 | 19,463 |
| Pump | | |
| 466 | 23,100 | 17,226 |
| Subtotal | 180,840 | 134,855 |
| Expander | | |
| 458 | −8,390 | −6,257 |
| Total | 172,450 | 128,598 |

Both of the processes illustrated in FIGS. 4 and 5 produce LNG and are variations of the process illustrated in FIG. 2A. For the process in FIG. 4, the LNG is produced by additional cooling from the liquid bottoms product, as in heat exchangers 336 and 337, and additional pressure drop across expander 358. The additional pressure drop is due to the higher pressure achieved by the overhead compression (360 and 361). In the process of this invention, both additional cooling with colder fluids and additional compression were used to produce LNG. However, it is not necessary to use both. The additional LNG can be produced by increasing the Although both of the processes illustrated in FIGS. 4 and 5 for producing LNG use a separation system using CFZ, a process using a freeze suppression additive in the process of FIG. 3 can also produce LNG. For example, although not illustrated in FIG. 3, a portion of stream 216 may be recovered as high pressure LNG similar to the process for recovery of LNG (stream 326) in FIG. 4. However, the practice of this invention is not limited to use of CFZ or freeze suppression additives. Other separation systems making use of the open-loop refrigeration may be used in the practice of this invention.

In this detailed description of the invention, embodiments are described for separation of methane and carbon dioxide using the CFZ or Ryan/Holmes process. However, this invention can also be used to separate other gases under operating conditions that have the potential for forming crystalline solids. The invention can be used to separate high volatility component from each other in the presence of a lower volatility freezable component. For example, the process can be used to separate a freezable component of relatively low volatility (e.g. $CO_2$, $H_2S$, benzene) and $CH_4$ from a high volatility component (e.g., $N_2$) whereby the freezable component and $CH_4$ are separated out as a liquid in a single splitter tower without freezing of the freezable component. Additionally, this invention can also be used with other processes operating at conditions that have the potential for forming crystalline solids.

A person skilled in the art, particularly one having the benefit of the teachings of this patent, will recognize many modifications and variations to the specific processes disclosed above. For example, a variety of temperatures and pressures may be used in accordance with the invention, depending on the overall design of the system and the composition of the feed gas. Also, the feed gas cooling train may be supplemented or reconfigured depending on the overall design requirements to achieve optimum and efficient heat exchange requirements. For example, more than one heat exchanger may be used, and additional coolers and other refrigeration devices may likewise be used in addition to the two separators exemplified in FIG. 2A, and fractionating devices may be used as separators. Additionally, certain process steps may be accomplished by adding devices that are interchangeable with the devices shown. For example, separating and cooling may be accomplished in a single device. As discussed above, the specifically disclosed embodiments and examples should not be used to limit or restrict the scope of the invention, which is to be determined by the claims below and their equivalents.

We claim:

1. A separation process comprising the steps of:
   (a) introducing a multi-component feed stream into a separation system, at least a portion of said system operating under solids forming conditions for at least one component of the feed stream;
   (b) withdrawing a vapor stream from an upper region of said separation system;
   (c) compressing said vapor stream to a higher pressure stream and thereafter cooling at least a portion of said compressed stream;
   (d) expanding said cooled compressed stream to further cool said compressed stream; and
   (e) feeding at least a portion of said expanded stream to said separation system and regulating the pressure of the compressed stream of step (c) and the pressure of the expanded stream (d) to prevent solids formation in the stream fed to said separation system, thereby providing refrigeration to at least a portion of said separation system.

2. The process of claim 1 wherein the vapor stream withdrawn in step (b) is passed in heat exchange relationship with the compressed stream of step (c), thereby warming the vapor stream of step (b) and cooling the compressed stream of stream (c).

3. The process of claim 1 wherein said multi-component feed stream is introduced into a distillation section of said separation system wherein the separation system comprises a freezing section above said distillation section.

4. The process of claim 1 in which the separation system comprises a first distillation section, a second distillation section below the first distillation section, and a freezing zone between the first and second distillation sections, wherein the expanded stream is introduced into the first distillation section.

5. The process of claim 1 in which the separation system comprises a first distillation section, a second distillation section below the first distillation section, and a freezing zone between the first and second distillation sections, wherein the expanded stream is introduced into the freezing zone.

6. The process of claim 1 wherein a freeze suppression agent is introduced to the expanded stream before the expanded stream is fed to said separation system.

7. The process of claim 6 wherein the freeze suppression agent comprises ethane, propane, butane, pentane, and higher hydrocarbons, methanol, ethanol, glycol, or mixture thereof.

8. The process of claim 6 wherein said freeze suppression agent is separated from a bottoms product of said separation system and recycled to said expanded stream before said expanded stream is fed to said separation system.

9. The process of claim 1 further comprising removing liquid from the separation system, cooling said liquid by a pressure expansion means, and at least partially vaporizing said liquid by heat exchange with the compressed stream of step (c).

10. The process of claim 1 further comprising removing liquid from the separation system, cooling said removed liquid by a pressure expansion means, and cooling the multi-component feed stream before it enters the separation system by heat exchange with said cooled removed liquid.

11. The process of claim 1 further comprising cooling the multi-component feed stream by an expansion means before it enters the separation system.

12. The process of claim 1 wherein said separation system comprises a first distillation column and a second distillation column, said first distillation column comprising a distillation section and a freezing zone above the distillation section, said second distillation column comprising a distillation section, further comprising introducing said feedstream of step (a) into said first distillation column, feeding a vapor overhead stream from said freezing zone to a lower region of the second distillation column, withdrawing the vapor stream of step (b) from the second distillation column, feeding the expanded stream of step (d) to the upper region of said second separation system, withdrawing a liquid bottom stream from said second distillation column, and feeding the liquid bottom stream to said freezing zone of said first distillation column.

13. A process of separating a multi-component feed stream containing at least methane and a freezable component having a relative volatility less than that of methane, comprising the steps of:
   (a) cooling the multi-component feed stream;
   (b) introducing the multi-component feed stream to the separation system, said separation system having an overhead stream enriched with methane and a bottoms stream enriched with the freezable component and at least a portion of said separation system operating at a temperature and pressure which would freeze said freezable component;
   (c) returning a portion of said overhead stream to the upper zone of the separation system;
   (d) supplying refrigeration to the upper portion of the separation system from compressing and cooling a portion of the overhead stream to be returned to the separation system and thereafter expanding said portion of the overhead stream to provide further cooling; and (e) regulating the pressure of the compressed stream of step (d) and the pressure of the expanded stream (d) to prevent solids formation in the stream fed to the separation system.

14. The process of claim 13 wherein after said compression of the overhead stream and prior to its expansion, passing said compressed overhead stream into heat exchange relation with said overhead stream from the separation system, thereby cooling the compressed overhead stream before its expansion.

15. The process of claim 13 wherein the feed stream prior to entering the separation system is in heat exchange relationship with a liquid from the separation system to provide reboiling to the lower portion of the separation system and to cool the feed stream.

16. The process of claim 13 wherein a freeze suppression agent is introduced to the expanded stream of step (d) before the expanded stream is fed into said separation system.

17. The process of claim 16 wherein the freeze suppression agent comprises ethane, propane, butane, pentane, and higher hydrocarbons, methanol, ethanol, glycol, or mixture thereof.

18. The process of claim 16 wherein said freeze suppression agent is separated from a bottoms stream of said separation process and recycled to said expanded stream before said expanded stream is fed to said separation system.

19. The process of claim 13 further comprising removing liquid from the separation system, cooling said liquid by a pressure expansion means, and at least partially vaporizing said liquid by heat exchange with the compressed overhead stream of step (d).

20. The process of claim 13 further comprising removing liquid from the separation system, cooling said liquid by a pressure expansion means, and cooling the multi-component feed stream before it enters the separation system by heat exchange with said expanded liquid.

21. The process of claim 13 further comprising cooling the multi-component gas stream by an expansion means before it enter the separation system.

22. A separation process comprising the steps of:
(a) introducing a multi-component feed stream into a separation system, said separation system comprising a first distillation section, a second distillation section below the first distillation section, and a freezing zone between the first and second distillation sections, at least a portion of said freezing zone operating under solids forming conditions for at least one component of the feed stream;
(b) withdrawing a vapor stream from an upper region of said separation system;
(c) compressing said vapor stream to a higher pressure stream and thereafter cooling at least a portion of said compressed stream;
(d) expanding said cooled compressed stream to further cool said compressed stream; and
(e) feeding at least a portion of said expanded stream to into the first distillation section of said separation system, thereby providing refrigeration to at least a portion of said separation system.

23. A separation process comprising the steps of:
(a) introducing a multi-component feed stream into a separation system, said separation system comprises a first distillation section, a second distillation section below the first distillation section, and a freezing zone between the first and second distillation sections, at least a portion of said freezing zone operating under solids forming conditions for at least one component of the feed stream;
(b) withdrawing a vapor stream from an upper region of said separation system;
(c) compressing said vapor stream to a higher pressure stream and thereafter cooling at least a portion of said compressed stream;
(d) expanding said cooled compressed stream to further cool said compressed stream; and
(e) feeding at least a portion of said expanded stream into the freezing zone said separation system, thereby providing refrigeration to at least a portion of said separation system.

24. A separation process comprising the steps of:
(a) introducing a multi-component feed stream into a separation system, at least a portion of said separation system operating under solids forming conditions for at least one component of the feed stream;
(b) withdrawing a vapor stream from an upper region of said separation system;
(c) compressing said vapor stream to a higher pressure stream and thereafter cooling at least a portion of said compressed stream;
(d) expanding said cooled compressed stream to further cool said compressed stream;
(e) feeding at least a portion of said expanded stream to said separation system, thereby providing refrigeration to at least a portion of said separation system; and
(f) removing liquid from the separation system, cooling said liquid by a pressure expansion means, and at least partially vaporizing said liquid by heat exchange with the compressed stream of step (c).

25. A separation process comprising the steps of:
(a) introducing a multi-component feed stream into a separation system, at least a portion of said system operating under solids forming conditions for at least one component of the feed stream;
(b) withdrawing a vapor stream from an upper region of said separation system;
(c) compressing said vapor stream to a higher pressure stream and thereafter cooling at least a portion of said compressed stream;
(d) expanding said cooled compressed stream to further cool said compressed stream;
(e) feeding at least a portion of said expanded stream to said separation system, thereby providing refrigeration to at least a portion of said separation system; and
(f) removing liquid from said separation system, cooling said removed liquid by a pressure expansion means, and cooling the multi-component feed stream before it enters said separation system by heat exchange with said cooled removed liquid.

26. A separation process using a separation system that comprises a first distillation column and a second distillation column, said first distillation column comprising a distillation section and a freezing zone above the distillation section, said second distillation column comprising a distillation section, said process comprising the steps of:
(a) introducing a multi-component feed stream into said first distillation column, feeding a vapor overhead stream from said freezing zone to a lower region of the second distillation column, at least a portion of said separation system operating under solids forming conditions for at least one component of the feed stream;

(b) withdrawing a vapor stream from the second distillation column of said separation system;

(c) compressing said vapor stream to a higher pressure stream and thereafter cooling at least a portion of said compressed stream;

(d) expanding said cooled compressed stream to further cool said compressed stream;

(e) feeding at least a portion of said expanded stream to the upper region of said second separation system system, thereby providing refrigeration to at least a portion of said separation system;

(f) withdrawing a liquid bottom stream from said second distillation column; and (g) feeding the liquid bottom stream to said freezing zone of said first distillation column.

* * * * *